(12) United States Patent
Lu

(10) Patent No.: US 7,343,839 B2
(45) Date of Patent: Mar. 18, 2008

(54) BAR FEEDER

(75) Inventor: Fang-Chin Lu, Taichung County (TW)

(73) Assignee: Barload Machine Co., Ltd. (TW)

( * ) Notice: Subject to any disclaimer, the term of this patent is extended or adjusted under 35 U.S.C. 154(b) by 71 days.

(21) Appl. No.: 11/451,387

(22) Filed: Jun. 13, 2006

(65) Prior Publication Data

US 2007/0163407 A1 Jul. 19, 2007

(30) Foreign Application Priority Data

Jan. 18, 2006 (TW) .............................. 95101924 A

(51) Int. Cl.
*B23B 3/00* (2006.01)
*B23B 13/00* (2006.01)

(52) U.S. Cl. .............................. 82/126; 82/127; 82/124

(58) Field of Classification Search .................. 82/124, 82/126, 127; 414/18; 198/717
See application file for complete search history.

(56) References Cited

U.S. PATENT DOCUMENTS 4,889,024 A * 12/1989 Geiser et al. .................. 82/127
5,115,702 A * 5/1992 Link ............................ 82/126
5,195,409 A * 3/1993 Smith .......................... 82/127
5,326,210 A * 7/1994 Savage ........................ 414/17
5,465,471 A * 11/1995 Munk .......................... 29/563
6,189,424 B1 * 2/2001 Wheeling et al. ............ 82/1.11
6,302,003 B1 * 10/2001 Haller et al. ................. 82/1.11
7,124,880 B2 * 10/2006 Lee ............................ 198/717

* cited by examiner

*Primary Examiner*—Willmon Fridie, Jr.
(74) *Attorney, Agent, or Firm*—Browdy and Neimark, PLLC

(57) ABSTRACT

A bar feeder includes a feeder tube mounted on a machine base, a transmission mechanism, a driving mechanism having a rotary shaft, a projecting rod connected to the driving mechanism and rotatable with the rotary shaft to engage or disengage from the transmission mechanism, a pushing rod, and a driven mechanism rotatable with the rotary shaft to move the pushing rod into engagement or away from the transmission mechanism. When the pushing rod and the transmission mechanism are coupled together, the pushing rod is movable along the feeder tube, and the projecting rod is disengaged from the transmission mechanism and moved away from the feeder tube. When the pushing rod and the transmission mechanism are disconnected, the pushing rod is not movable along the feeder tube, and the projecting rod is coupled to the transmission mechanism and movable along the feeder tube.

8 Claims, 6 Drawing Sheets

BAR FEEDER

BACKGROUND OF THE INVENTION

1. Field of the Invention

The present invention relates to a bar material feeding machine for feeding a bar material into a processing machine, such as a lathe, and particularly, to a bar feeder, which is capable of reducing vibration and noise during its working.

2. Description of the Related Art

In a conventional bar feeder and lathe system, the bar feeder is provided at the rear side of the automatic lathe and adapted to feed a bar material into the automatic lathe for processing.

A conventional bar feeder generally comprises a rotary shaft, a transmission mechanism, a pushing rod, and a projecting rod. The rotary shaft has a coupling member. The transmission mechanism comprises a chain. The pushing rod is fixedly connected to the chain. The projecting rod is coupled to the coupling member of the rotary shaft and rotatable with the rotary shaft between a first position where the projecting rod is engaged with the chain and a second position where the projecting rod is disengaged from the chain. When the projecting rod is engaged with the chain, the projecting rod is kept in a feeder tube and movable in an axial direction along the feeder tube. When the projecting rod is disengaged from the chain, the pushing rod is forced to move a bar material in the feeder tube to a position where is supposed to be the front end of the projecting rod when the projecting rod is stayed in the feeder tube and then returned to its former position. At this time, the rotary shaft drives the projecting rod into engagement with the chain so that the projecting rod and the pushing rod are simultaneously movable with the chain in the feeder tube to project the bar material into the automatic lathe for processing.

When projecting the bar material to the automatic lathe, the projecting rod and the pushing rod are moved with the chain. However, because there is a gap between the projecting rod and the pushing rod, vibration and noise are produced when projecting the bar material into the automatic lathe for processing. Further, the gap between the projecting rod and the pushing rod may cause accidental engagement between the pushing rod and the feeder tube or chain during movement of the pushing rod, resulting in a machine failure. Therefore, the aforesaid conventional bar feeder is not convenient in use.

SUMMARY OF THE INVENTION

The present invention has been accomplished under the circumstances in view. It is one object of the present invention to provide a bar feeder, which is capable of reducing vibration and noise during its working.

It is another object of the present invention to provide a bar feeder, which reduces the risk of machine failure and enhances the convenient of use of the machine.

To achieve these objects of the present invention, the bar feeder comprises a machine base, a feeder tube, a transmission mechanism, a driving mechanism, a projecting rod, a driven mechanism, and a pushing rod. The feeder tube is mounted on the machine base. The transmission mechanism is mounted on the machine base. The driving mechanism is mounted on the machine base and has a rotary shaft, a coupling member disposed at the rotary shaft, and an actuating member disposed at the rotary shaft. The projecting rod is mounted on the machine base and connected to the coupling member of the driving mechanism and rotatable with the rotary shaft between a first position where the projecting rod is engaged with the transmission mechanism and a second position where the projecting rod is disengaged from the transmission mechanism. The driven mechanism is mounted on the machine base and has a driven member arranged in a coaxial manner relative to the feeder tube. The pushing rod is mounted in the feeder tube and connected to the driven member for rotation with the rotary tube between a first position where the pushing rod is coupled to the transmission mechanism and a second position where the pushing rod is disconnected from the transmission mechanism. When the pushing rod and the transmission mechanism are coupled together, the pushing rod is movable axially along the feeder tube, and the projecting rod is disconnected from the transmission mechanism and moved away from the feeder tube. When the pushing rod is disconnected from the transmission mechanism, the pushing rod is not movable axially along the feeder tube, and the projecting rod is coupled to the transmission mechanism and movable axially along the feeder tube.

DETAILED DESCRIPTION OF THE INVENTION

Figure 1:
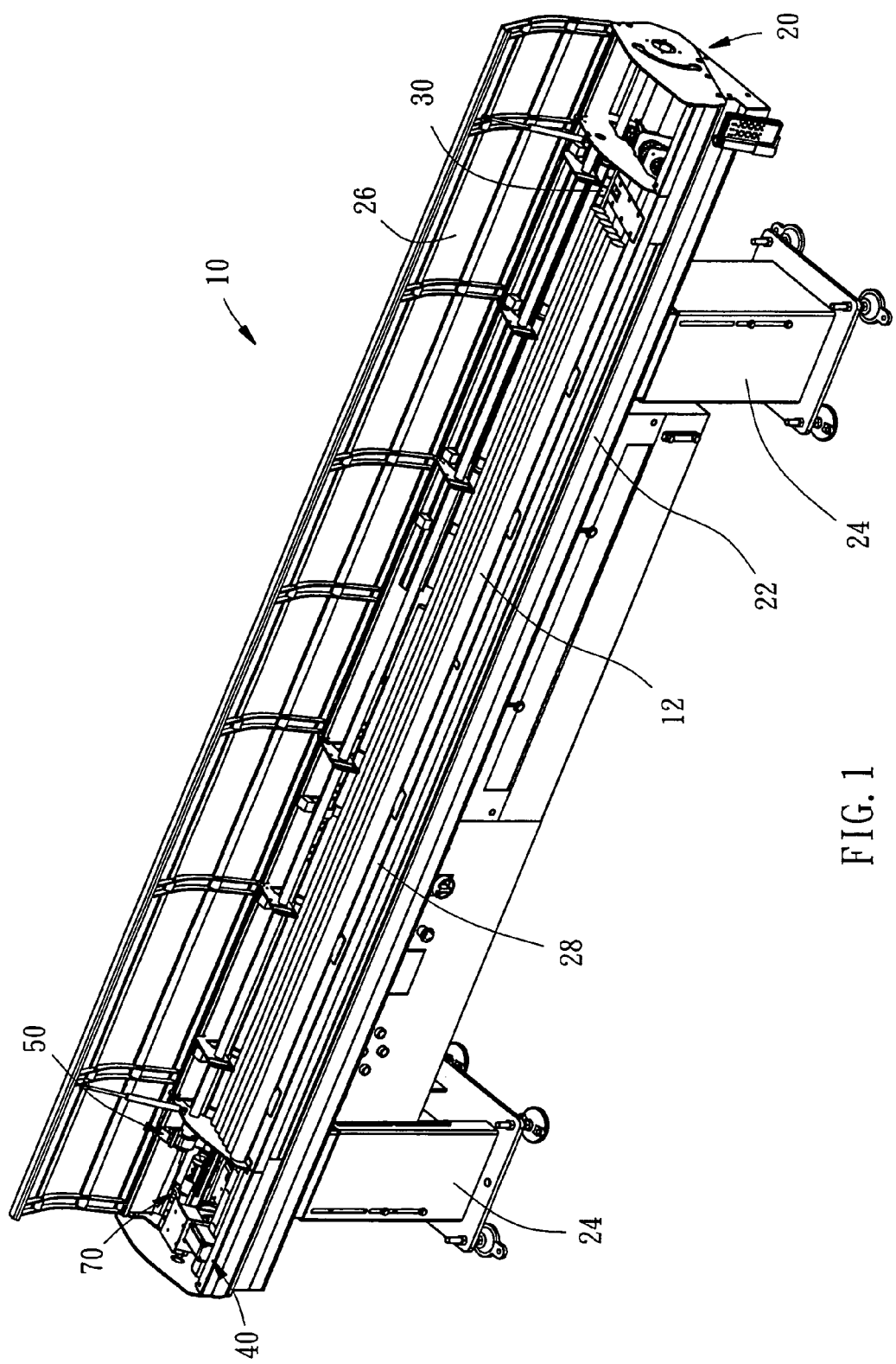
FIG. 1 is a perspective view of a bar feeder in accordance with a preferred embodiment of the present invention.
Figure 2:
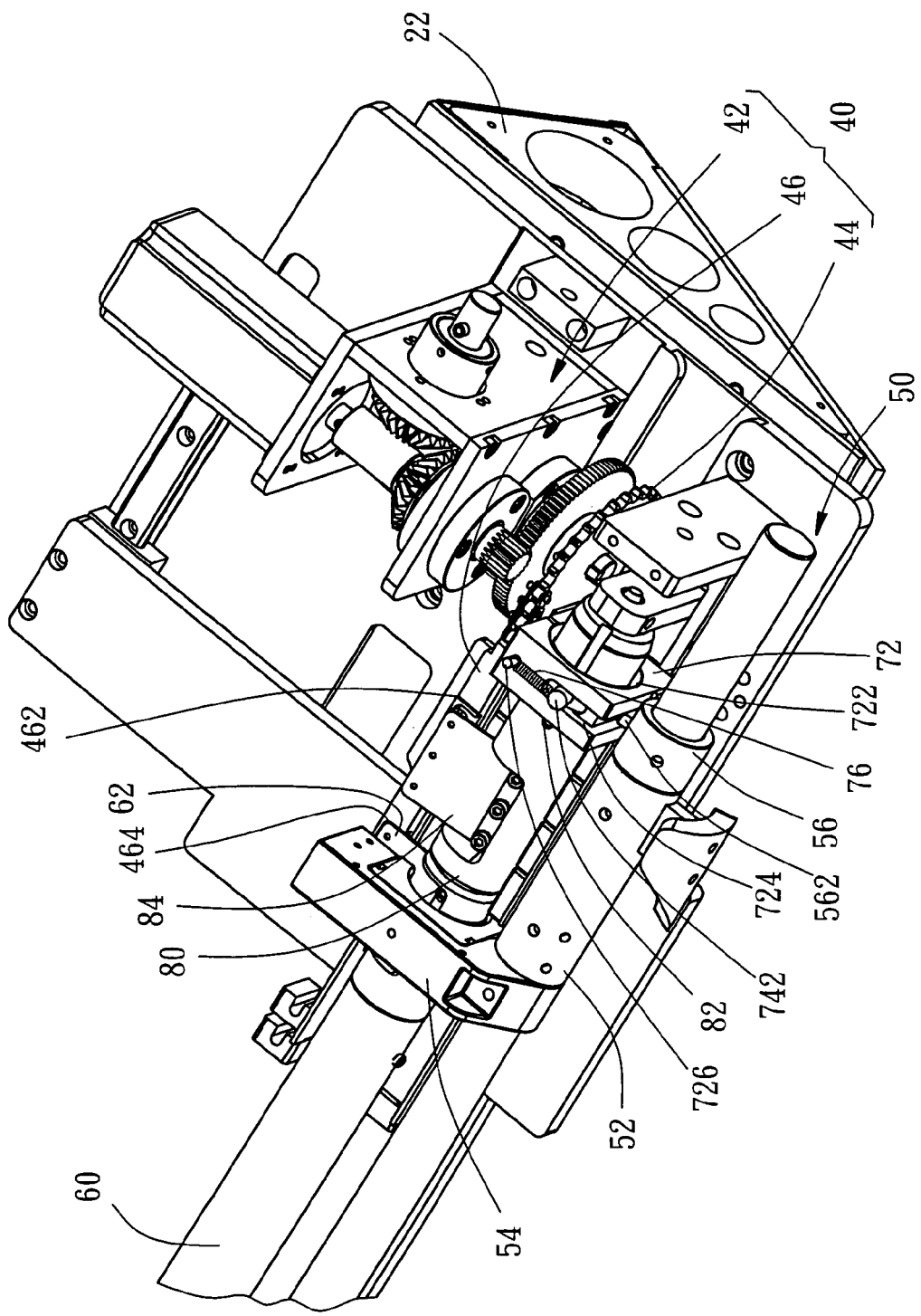
FIG. 2 is a perspective view in an enlarged scale of a part of the bar feeder according to the preferred embodiment of the present invention.

As shown in FIGS. 1 and 2, a bar feeder 10 in accordance with a preferred embodiment of the present invention comprises a machine base 20, a feeder tube 30, a transmission mechanism 40, a driving mechanism 50, a projecting rod 60, a driven mechanism 70, and a pushing rod 80.

The machine base 20 comprises a worktable 22, two stands 22 provided at the bottom side of the worktable 22 for supporting the worktable 22 on the floor, a top cover 26 provided at the top side of the worktable 22 and adapted to prohibit the operator from touching the internal parts of the bar feeder 10 accidentally during operation of the bar feeder 10, and a material rack 28 for holding bar materials 12.

The feeder tube 30 is mounted on the worktable 22 of the machine base 20 and adapted to receive the bar material 12 from the material rack 28 for feeding to a processing machine, for example, an automatic lathe (not shown) for processing.

The transmission mechanism 40 is mounted in one end of the worktable 22 of the machine base 20, comprising a transmission gear set 42, a chain 44 coupled to the transmission gear set 42, and a movable member 46 fastened to the chain 44 and movable backwards and forwards with the chain 44 upon rotation of the transmission gear set 42. The movable member 46 has two retaining grooves 462 and 464 that are spaced from each other at a predetermined distance.

The driving mechanism 50 is installed in the worktable 22 of the machine base 20, comprising a rotary shaft 52, a coupling member 54 fixedly mounted on the rotary shaft 52, and an actuating member 56 sleeved onto the rotary shaft 52. The actuating member 56 has a protruding portion 562. The coupling member 54 and the actuating member 56 are rotatable with the rotary shaft 52.

Figure 5:
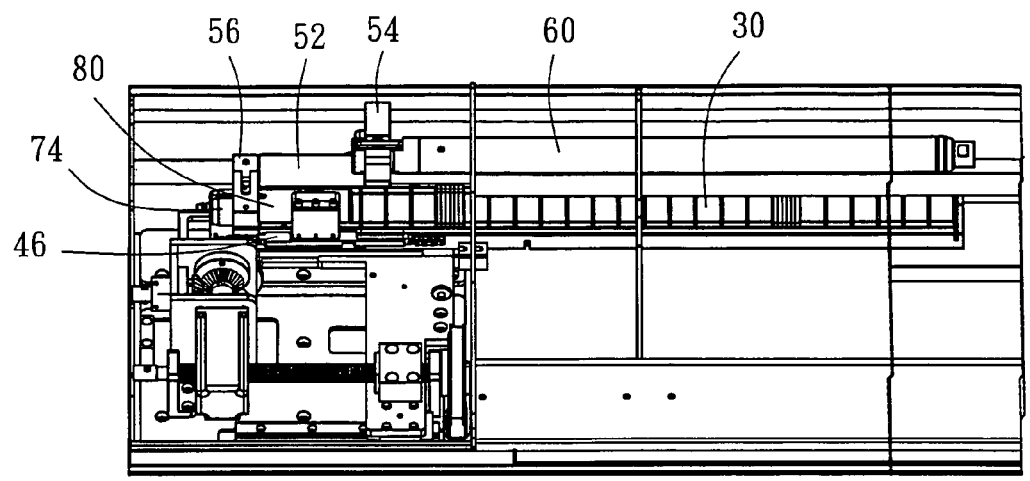
FIG. 5 is a schematic drawing showing the projecting rod disengaged from the transmission mechanism according to the present invention.
Figure 7:
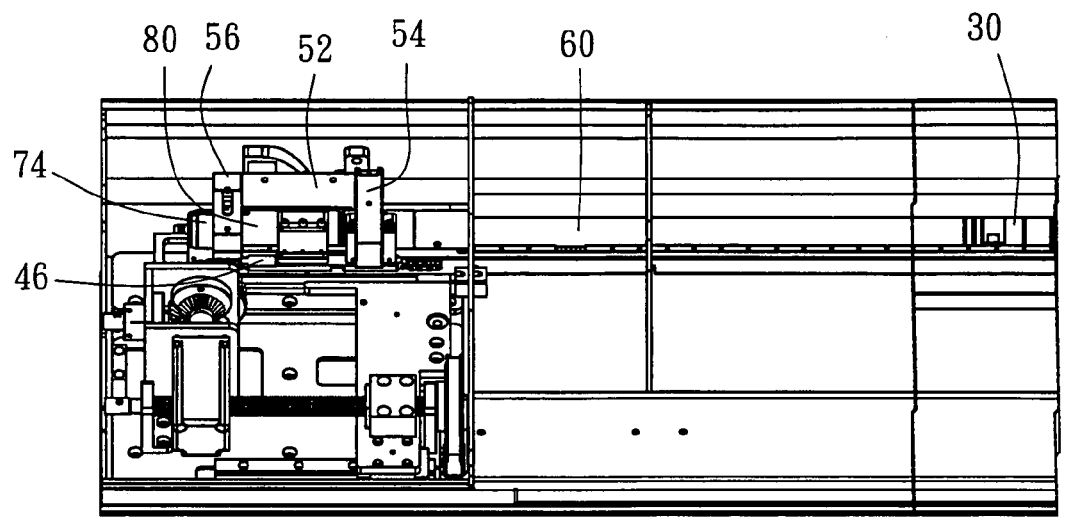
FIG. 7 is a schematic drawing showing the projecting rod engaged with the transmission mechanism according to the present invention.

The projecting rod 60 is mounted on the worktable 22 of the machine base 20 and connectable to the coupling member 54 of the driving mechanism 50. The projecting rod has an engagement portion 62 which is engageable with the retaining groove 464 of the moveable member 46. When the coupling member 54 of the driving mechanism 50 is coupled to the projecting rod 60 and biased towards the top side by means of the rotary motion of the rotary shaft 52 as shown in FIG. 5, the engagement portion 62 is disengaged from the retaining groove 464 of the movable member 46 of the transmission mechanism 40, so that the projecting rod 60 is moved away from the feeder tube 30. On the contrary, when the coupling member 54 is biased to the bottom side as shown in FIG. 7, the engagement portion 62 is forced into engagement with the retaining groove 464, and the coupling member 54 is disengaged from the projecting rod 60 for enabling the projecting rod 60 to be slidably set in the feeder tube 30 and moveable forwards in the feeder tube 30 by the movable member 46.

Figure 3:
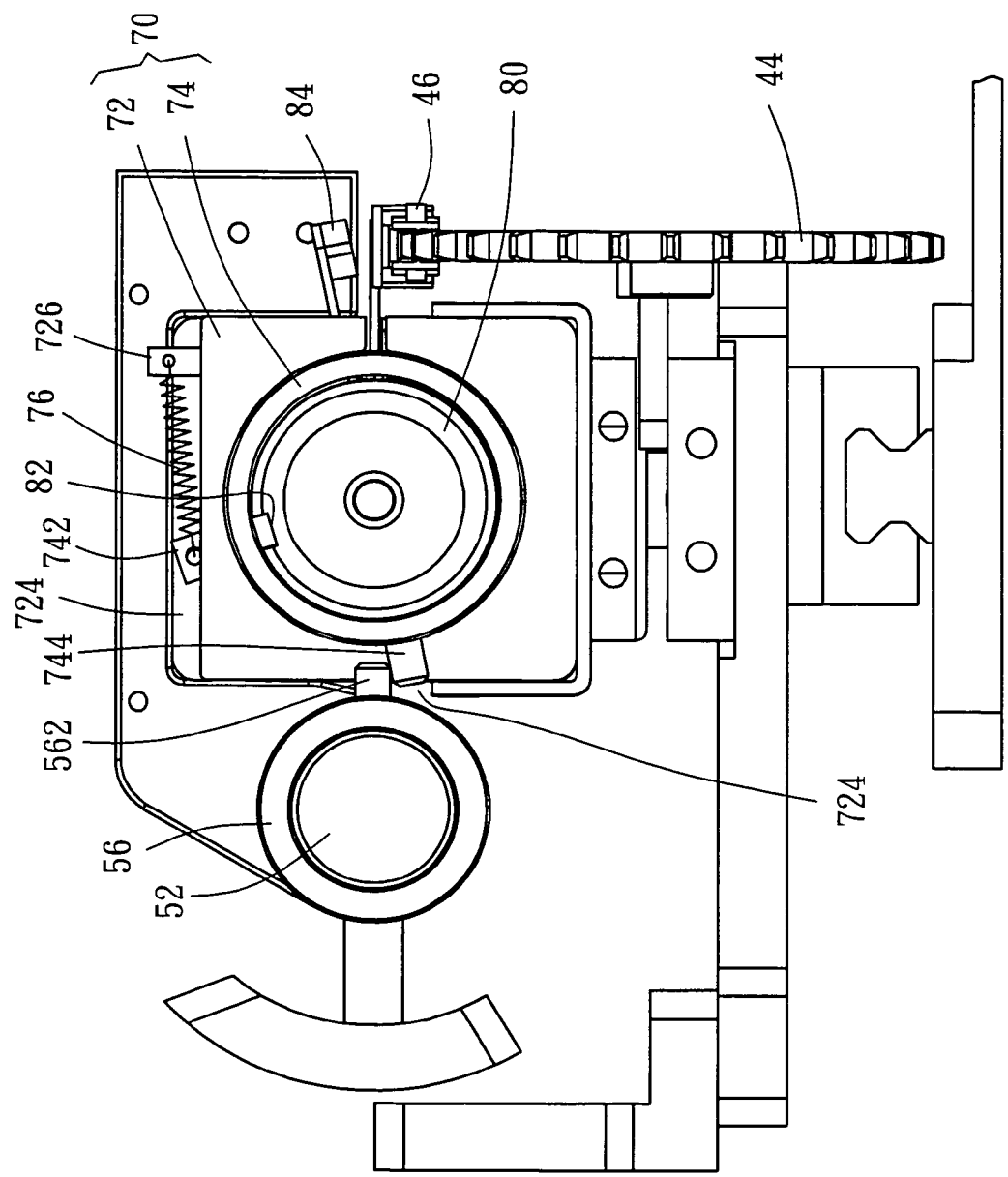
FIG. 3 is a schematic drawing showing the actuating member pressed on the driven member according to the present invention.
Figure 4:
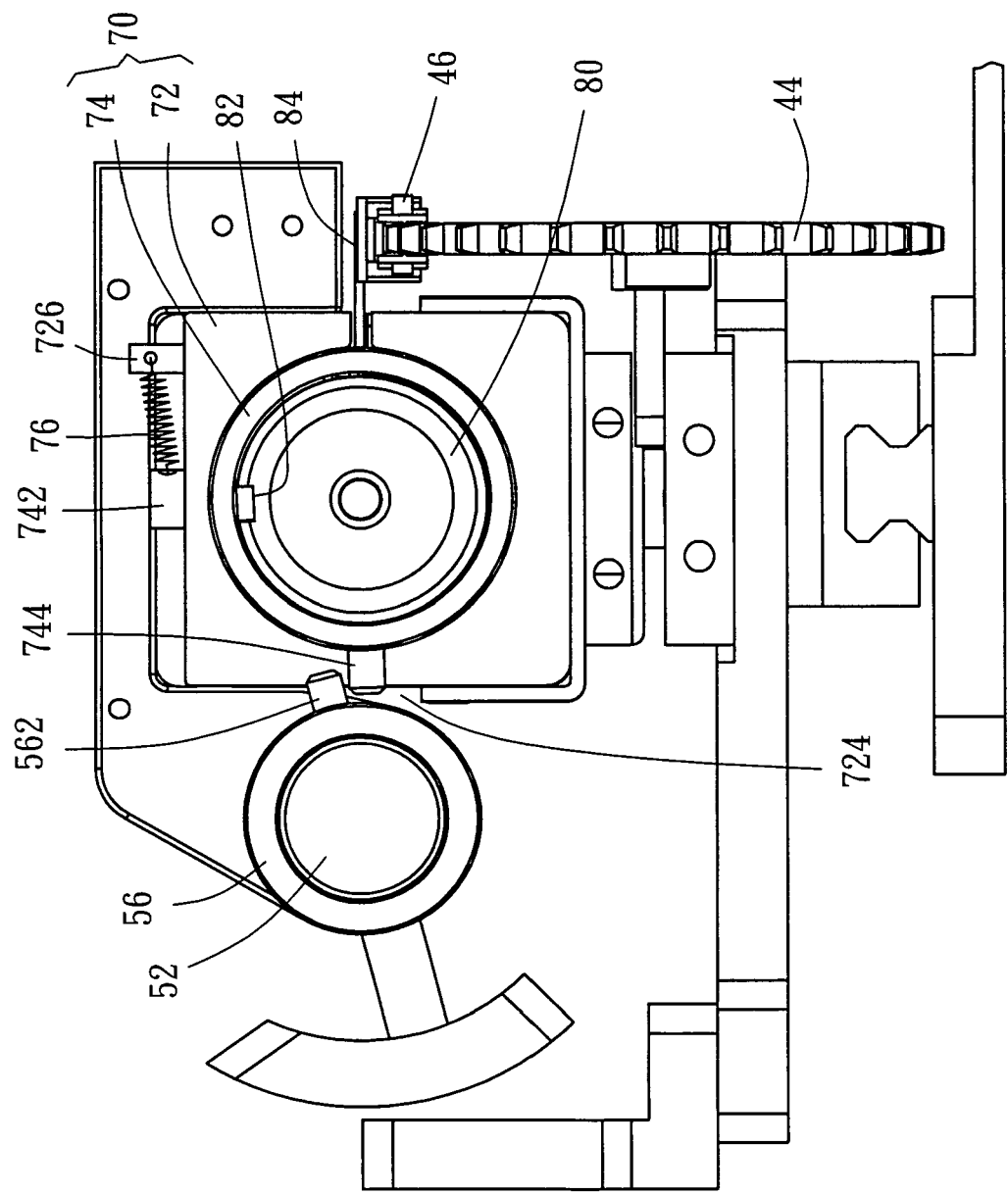
FIG. 4 is similar to FIG. 3 but showing the actuating member disengaged from the driven member.

Referring to FIGS. 2-4, the driven mechanism 70 comprises a holder block 72 and a hollow driven member 74. The holder block 72 has a center through hole 722, which extends through the front and back sides thereof, and a cutting groove 724, which extends from the mid point of the top side to the center of the left side. The protruding portion 562 of the actuating member 56 of the driving mechanism 50 is inserted into the cutting groove 724 of the holder block 72. Further, the holder block 72 has a positioning rod 726 at one end of the top side. The driven member 74 is inserted through the center through hole 722, having a locating rod 742 and a protruding portion 744. The locating rod 742 is inserted into the cutting groove 724 at the top side of the holder block 72. Further, the bottom end of the locating rod 742 extends through the driven member 74 and suspends inside the driven member 74. The protruding portion 744 is inserted into the cutting groove 724 at the left side of the holder block 72. Further, a spring member 76 is provided between the locating rod 742 and the positioning rod 726.

The pushing rod 80 is slidably mounted inside the driven member 74 and provided with a groove 82 at the top end thereof. The bottom end of the locating rod 742 is engaged into the groove 82 of the pushing rod 80 for enabling the driven member 74 to rotate the pushing rod 80. Further, the pushing rod 80 has an engagement portion 84 which is engageable into the retaining groove 462 of the movable member 46. When the actuating member 56 is turned downwards with the rotary shaft 52, the protruding portion 562 of the actuating member 56 is forced downwards against the protruding portion 744 of the driven member 74 so that the pushing rod 80 is rotated with the driven member 74. At this time, the engagement portion 84 of the pushing rod 80 is disengaged from the retaining groove 462 of the movable member 46, and the spring member 76 is stretched by the driven member 74 (see FIG. 3). When the actuating member 56 is turned upwards with the rotary shaft 52, the protruding portion 562 of the actuating member 56 is disengaged from the protruding portion 744 of the driven member 74, and the driven member 74 is returned to its former position by the spring force of the spring member 76 (see FIG. 4), causing the engagement portion 84 of the pushing rod 80 to be engaged into the retaining groove 462 of the movable member 46. At this time, the pushing rod 80 is received in the feeder tube 30 and moveable forwards with the movable member 46 along the feeder tube 30.

Figure 6:
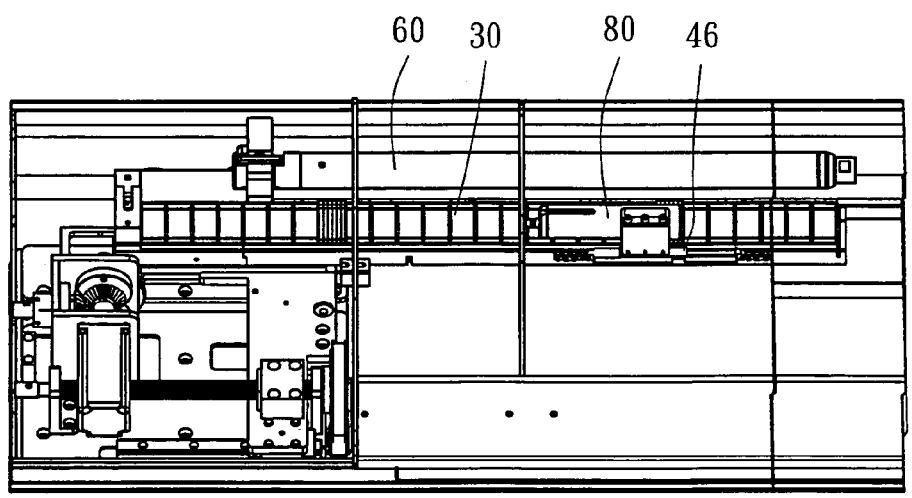
FIG. 6 is a schematic drawing showing the pushing rod pushed the bar material to a position where is supposed to be the front end of the projecting rod according to the present invention.
Figure 8:
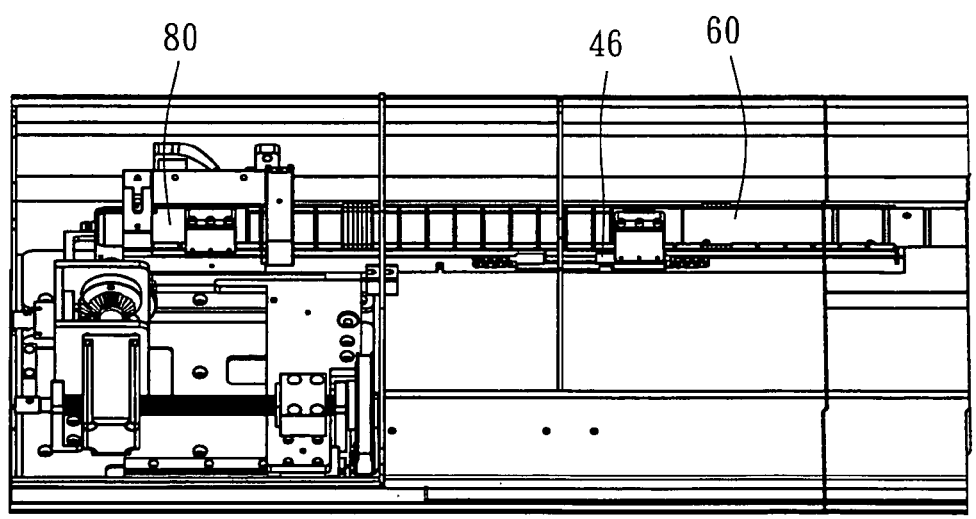
FIG. 8 is a schematic drawing showing the bar material moved by the projecting rod forwards according to the present invention.

Referring to FIG. 5, when starting the bar feeder 10, the operator must control the bar feeder 10 to rotate the rotary shaft 52, enabling the coupling member 54 and the actuating member 56 to be turned with the rotary shaft 52 towards the top side. At this time, the coupling member 54 moves the projecting rod 60 away from the feeder tube 30 for allowing the bar material 12 to be moved into the feeder tube 30, and the actuating member 56 is moved away from the driven member 74 for allowing the pushing rod 80 to be engaged with the movable member 46, as shown in FIG. 6, so that the pushing rod 80 can be moved forwards by the moveable member 46 along the feeder tube 30 to push the bar material 12 to a position where is supposed to be approximately the front end of the projecting rod 60 when the projecting rod 60 is positioned in the feeder tube 30 and then the pushing rod 80 will be returned with the moveable member 46 to its former position. Thereafter, as shown in FIG. 7, the coupling member 54 and the actuating member 56 are turned with the rotary shaft 52 to the bottom side. At this time, the coupling member 54 enables the projecting rod 60 to be set in the feeder tube 30 and to be engaged with the movable member 46, and the actuating member 56 is pressed on the driven member 74 to move the pushing rod 80 away from the movable member 46. Therefore, when the projecting rod 60 is moved along the feeder tube 30 to project the bar material 12 into the processing position, as shown in FIG. 8, the pushing rod 80 is kept in position and not moved with the projecting rod 60 forwards.

Therefore, the invention enables the pushing rod 80 to be disengaged from the transmission mechanism 40 so that the pushing rod 80 does not move with the projecting rod 60 during bar material feeding process, thereby reducing noise and vibration. Further, because the pushing rod 80 is not moved with the projecting rod 60 during feeding process, it reduces the risk of machine failure and enhances the convenience of use of the machine.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A bar feeder comprising:
   a machine base;
   a feeder tube mounted to said machine base;
   a transmission mechanism mounted to said machine base;
   a driving mechanism mounted to said machine base, said driving mechanism having a rotary shaft, a coupling member disposed at said rotary shaft, and an actuating member disposed at said rotary shaft;

a projecting rod mounted on said machine base and connected to said coupling member of said driving mechanism and rotatable with said rotary shaft between a first position where said projecting rod is engaged with said transmission mechanism and a second position where said projecting rod is disengaged from said transmission mechanism;

a driven mechanism mounted on said machine base, said driven mechanism having a driven member arranged in a coaxial manner relative to said feeder tube; and a pushing rod mounted in said feeder tube and connected to said driven member for rotation with said rotary tube between a first position where said pushing rod is coupled to said transmission mechanism and a second position where said pushing rod is disconnected from said transmission mechanism;

wherein when said pushing rod and said transmission mechanism are coupled together, said pushing rod is movable axially along said feeder tube, and said projecting rod is disconnected from said transmission mechanism and moved away from said feeder tube; when said pushing rod is disconnected from said transmission mechanism, said pushing rod is not movable axially along said feeder tube, and said projecting rod is coupled to said transmission mechanism and movable axially along said feeder tube.

2. The bar feeder as claimed in claim 1, wherein said actuating member and said driven member each have a protruding portion, the protruding portion of said actuating member being movable with rotation of said rotary shaft between a first position where the protruding portion of said actuating member is pressed on the protruding portion of said driven member and said pushing rod is disconnected from said driving mechanism, and a second position where the protruding portion of said actuating member is disengaged from the protruding portion of said driven member and said pushing rod is connected to said transmission mechanism.

3. The bar feeder as claimed in claim 2, wherein said driven mechanism further comprises a holder block having a through hole through which said driven member is inserted.

4. The bar feeder as claimed in claim 3, wherein said holder block has a positioning rod; said driven member has a locating rod; said driven mechanism further comprises a spring member connected between the positioning rod of said holder block and the locating rod of said driven member, said spring member being stretched when the protruding portion of said actuating member is pressed on the protruding portion of said driven member, said spring member returning said driven member when the protruding portion of said actuating member is disengaged from the protruding portion of said driven member.

5. The bar feeder as claimed in claim 4, wherein said pushing rod has a groove; said locating rod of said driven member is engageable into the groove of said pushing rod for enabling said driven member to move said pushing rod.

6. The bar feeder as claimed in claim 4, wherein said holder block has a cutting groove; said locating rod of said driven member is received in said cutting groove of said holder block.

7. The bar feeder as claimed in claim 6, wherein the protruding portion of said actuating member and the protruding portion of said driven member are respectively received in said cutting groove of said holder block.

8. The bar feeder as claimed in claim 1, wherein said transmission mechanism comprises a movable member having a retaining groove; said pushing rod has an engagement portion which is engaged into the retaining groove of said movable member when said pushing rod is moved with rotation of said rotary shaft to the first position, said engagement portion being disengaged from the retaining groove of said movable member when said pushing rod is moved with rotation of said rotary shaft to the second position.

\* \* \* \* \*